United States Patent [19]

Baulier et al.

[11] Patent Number: 4,946,089

[45] Date of Patent: Aug. 7, 1990

[54] PROCESS FOR INTERPOSITIONING OF TOOLS OF A BODY ASSEMBLY MACHINE

[75] Inventors: Dominique Baulier, Paris; Christian Defilippis, Evry; Jacques Jami, Aulnay-Sous-Bois; Bernard Negre, Paris; Alain Pierdet, Rosny-Sous-Bois, all of France; Bernard Negre, Paris; Alain Pierdet, Rosny-Sous-Bois, all of France

[73] Assignee: Regie Nationale des Usines Renault, Boulogne-Billancourt, France

[21] Appl. No.: 302,259

[22] Filed: Jan. 27, 1989

[30] Foreign Application Priority Data

Feb. 17, 1988 [FR] France ................. 88 01855

[51] Int. Cl.⁵ .......................................... B23K 37/00
[52] U.S. Cl. ................................. 228/45; 219/86.24
[58] Field of Search ............. 228/45; 901/41, 42; 29/568; 219/86.24

[56] References Cited

U.S. PATENT DOCUMENTS

| | | | |
|---|---|---|---|
| 2,215,693 | 9/1940 | Fleming et al. | 219/86.24 |
| 2,779,092 | 1/1957 | Gordon . | |
| 3,312,370 | 4/1967 | Kolarich et al. | 901/41 |
| 4,030,309 | 6/1977 | Mason | 901/41 |
| 4,046,263 | 9/1977 | Cwycyshyn et al. | 228/45 |
| 4,162,397 | 7/1979 | DeCandia | 219/86.24 |
| 4,256,947 | 3/1981 | DeCandia | 219/86.24 |
| 4,486,928 | 12/1984 | Tucker et al. | 901/41 |
| 4,512,709 | 4/1985 | Hennekes et al. | 901/41 |
| 4,520,550 | 6/1985 | Dunn et al. | 901/41 |
| 4,538,044 | 8/1985 | Kadowaki et al. | 219/86.24 |
| 4,635,328 | 1/1987 | Palmer | 901/41 |
| 4,659,895 | 4/1987 | DiRosa | 219/86.24 |
| 4,667,866 | 5/1987 | Tobita et al. | 901/42 |
| 4,670,961 | 6/1987 | Fontaine et al. . | |
| 4,684,778 | 8/1987 | Cecil | 901/42 |
| 4,710,093 | 12/1987 | Zimmer | 901/41 |
| 4,719,328 | 1/1988 | Yanagisawa et al. | 228/45 |
| 4,844,326 | 7/1989 | Kashihara et al. | 219/86.24 |

FOREIGN PATENT DOCUMENTS

2538744 7/1984 France ........................ 228/45
2075437 11/1981 United Kingdom .

Primary Examiner—M. Jordan
Attorney, Agent, or Firm—Oblon, Spivak, McClelland, Maier & Neustadt

[57] ABSTRACT

For precisely positioning a vehicle body relative to robots which spot weld the vehicle body, the vehicle body is mounted on a lower tool which is rigidly connected to front and rear upper tools which are selected from a tool magazine as a function of the geometry of the vehicle body. All of the tools are rigidly connected to one another to form a rigid annular structure surrouding the body and alone capable of positioning the body.

6 Claims, 9 Drawing Sheets

PROCESS FOR INTERPOSITIONING OF TOOLS OF A BODY ASSEMBLY MACHINE

BACKGROUND OF THE INVENTION

FIELD OF THE INVENTION

This invention relates to body assembly lines, for example for automobiles. It is directed more particularly to a process and a device for interpositioning of tools of a body assembly machine such as described in patent application FR No. 2,580,973 in the name of the applicant.

Its object is to improve this machine by making available a system that makes possible an interposition of its tools, i.e., one that by itself assures a perfect positioning of a body.

The prior art does not disclose or suggest any such system.

SUMMARY OF THE INVENTION

It is accordingly an object of the present invention to provide a process for precisely mounting tools for operating on a vehicle body.

It is another object of the invention to provide a process for precisely mounting tools for operating on a vehicle body such that the vehicle body is positioned with sufficient precision that it can be spot welded by robots.

The above, and other, objects are achieved according to one aspect of the invention by a process for mounting tools for operating on vehicle bodies, the tools including a lower tool positioned at a work station, a front upper tool and a rear upper tool. The process includes the steps of positioning the lower part of the front tool by self-centering on the front part of the lower tool, positioning the lower part of the rear tool by self-centering on the rear part of the lower tool, and positioning the upper part of the front tool by self-centering with the upper part of the rear tool, to form a rigid annular structure which is independent of any exterior structure.

According to a further feature of the invention, there is provided a process for precisely mounting tools for operating on a vehicle body, including the steps of positioning a vehicle body on a lower tool having means for supporting the vehicle body, selecting additional tools from a tool magazine as a function of the geometry of the vehicle body supported on the lower tool, mounting each of the additional tools on the lower tool and connecting the tools to form a rigid annular structure surrounding the body on the lower tool and alone capable of positioning the body relative to the annular structure.

BRIEF DESCRIPTION OF THE DRAWINGS

Other features and advantages of the invention will come out more clearly from the following description of a preferred embodiment, given by way of nonlimiting example, with reference to the accompanying drawings in which.

DETAILED DESCRIPTION OF THE PREFERRED EMBODIMENTS

Figure 1:
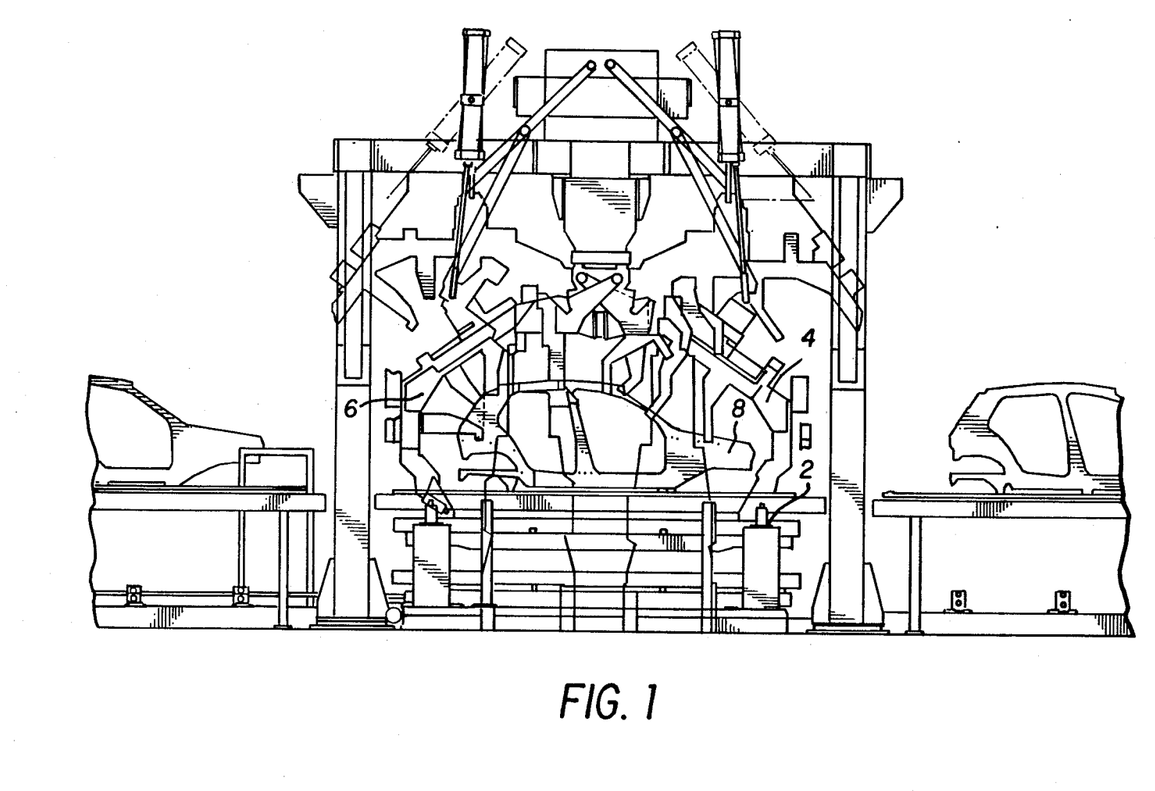
FIG. 1 represents a longitudinal view of a device for using the process according to the invention, without a tool magazine.
Figure 2:
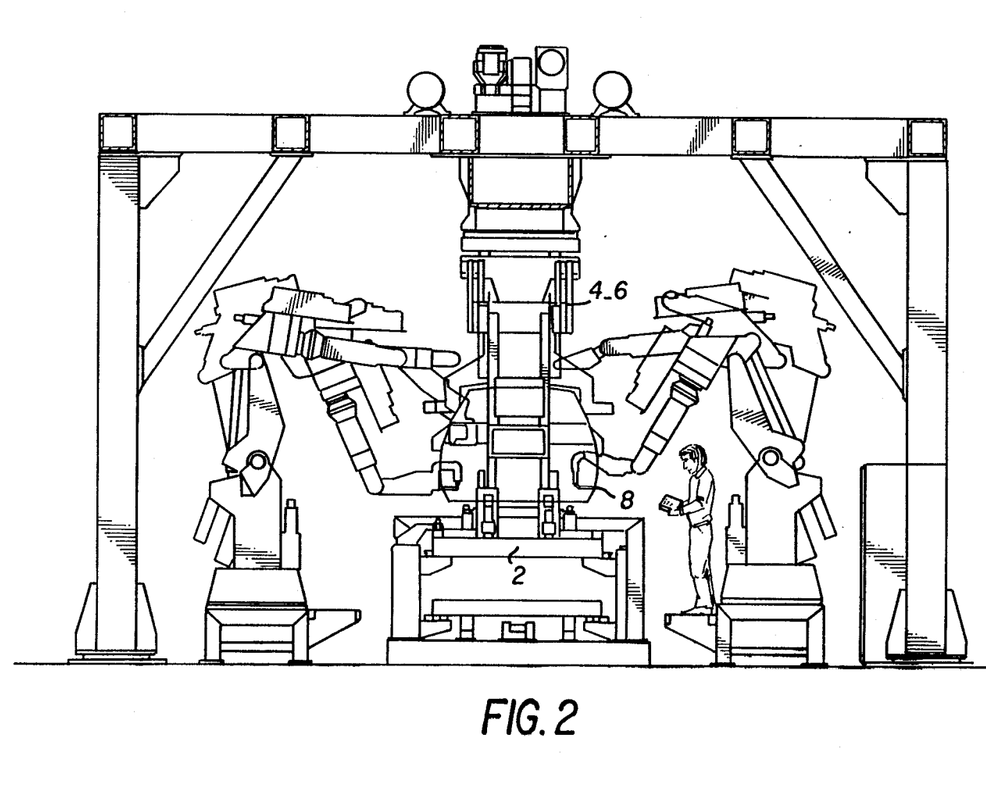
FIG. 2 represents a crosswise view of this device without a tool magazine.
Figure 3:
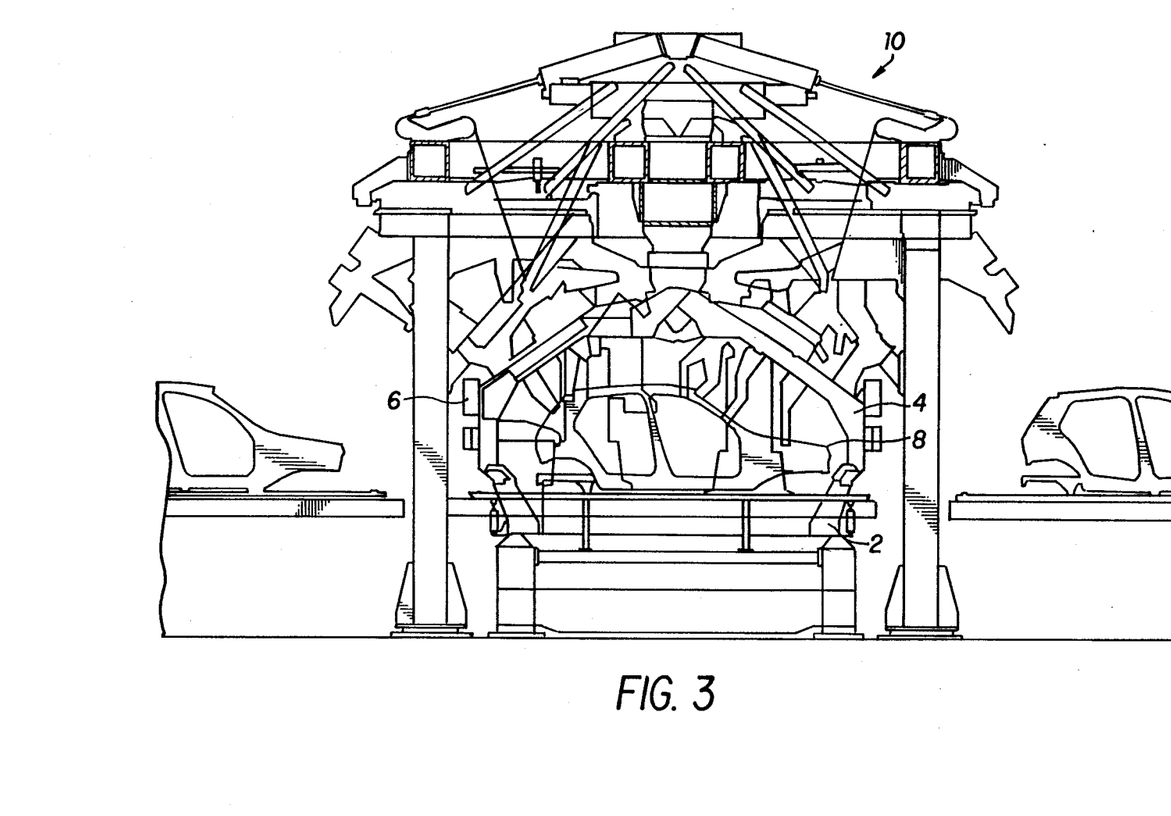
FIG. 3 represents a longitudinal view of this device with a rotating central magazine.
Figure 4:
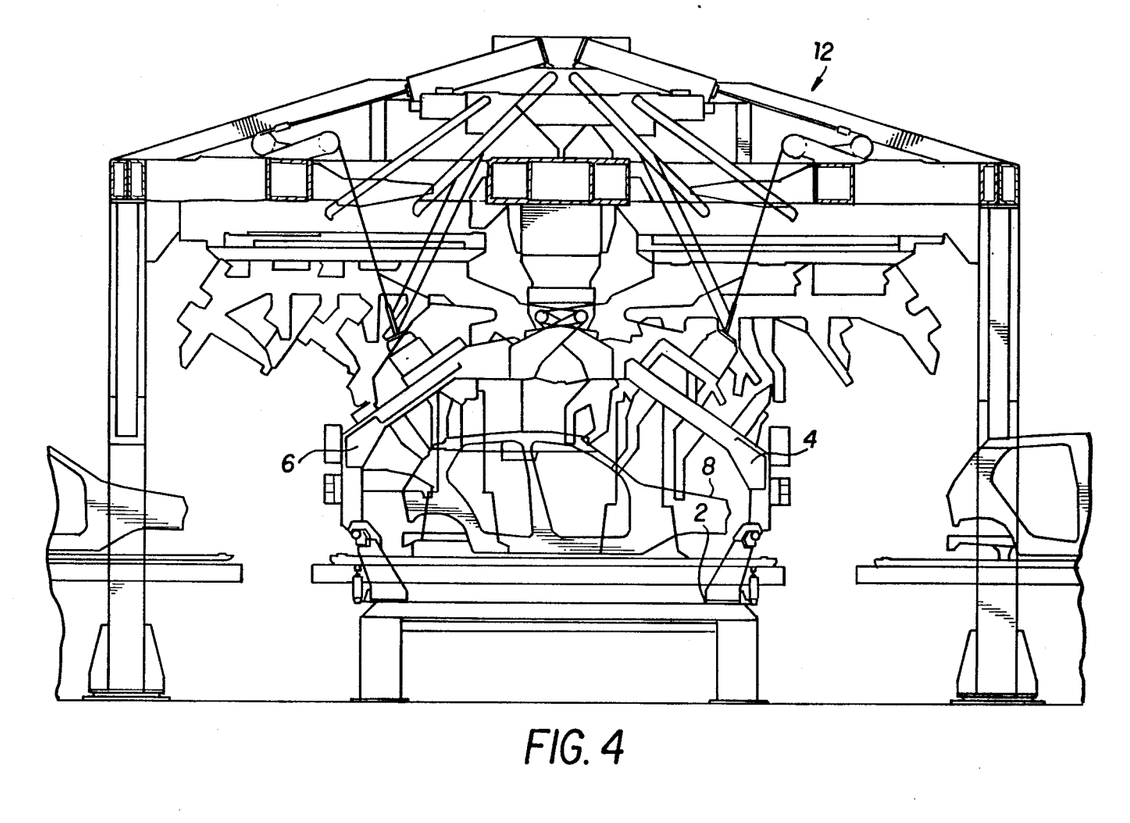
FIG. 4 represents a longitudinal view of this device with a linear magazine with two positions.
Figure 5:
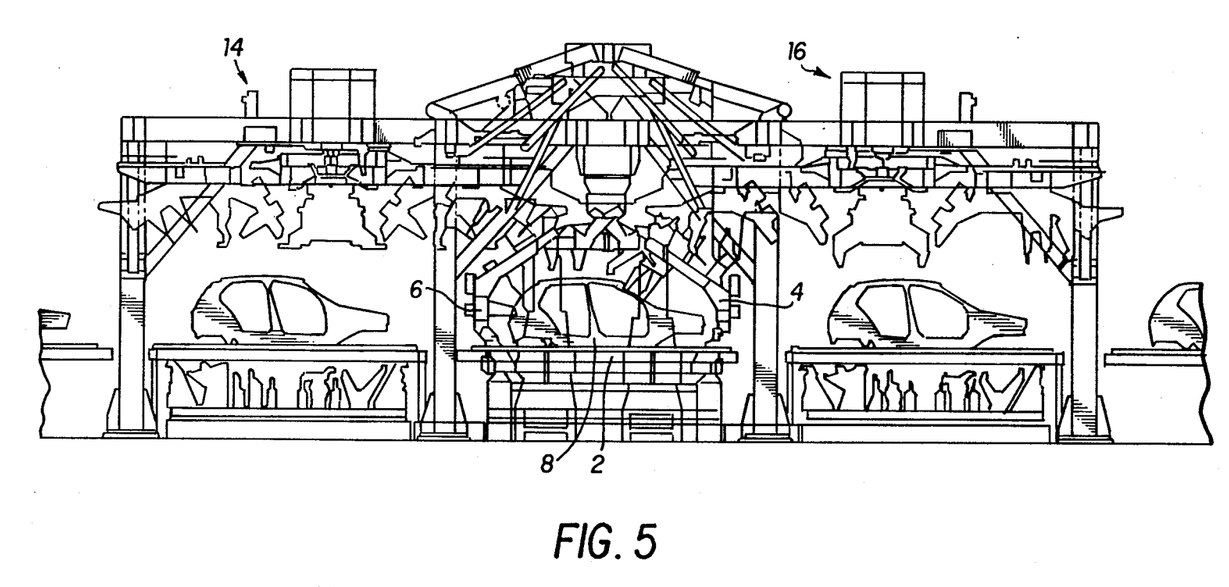
FIG. 5 represents a longitudinal view of this device with two front and rear rotating magazines.
Figure 6:
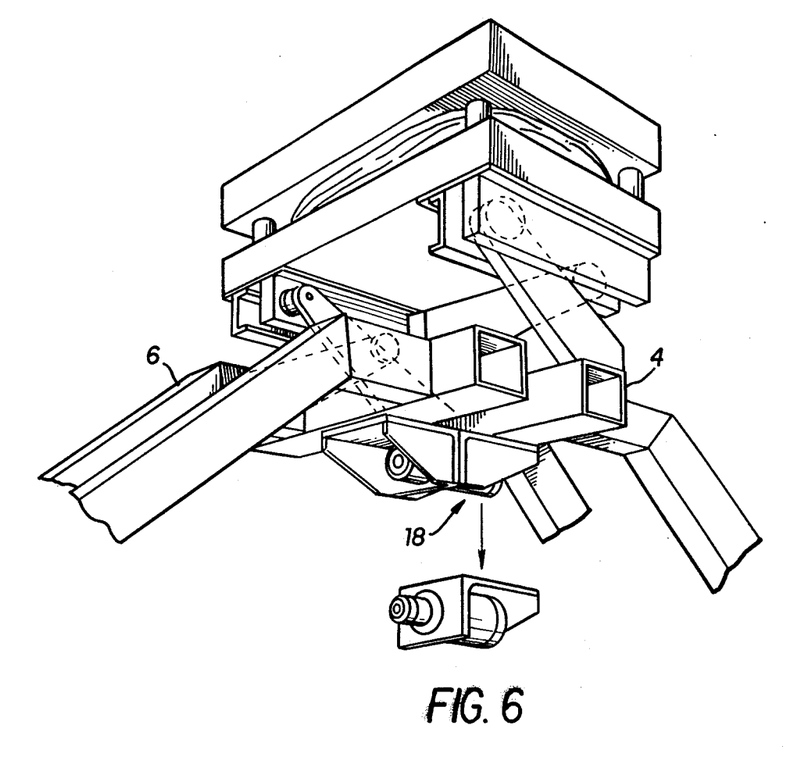
FIG. 6 represents a view of the upper interlocking device for the front and rear upper tools.
Figure 7:
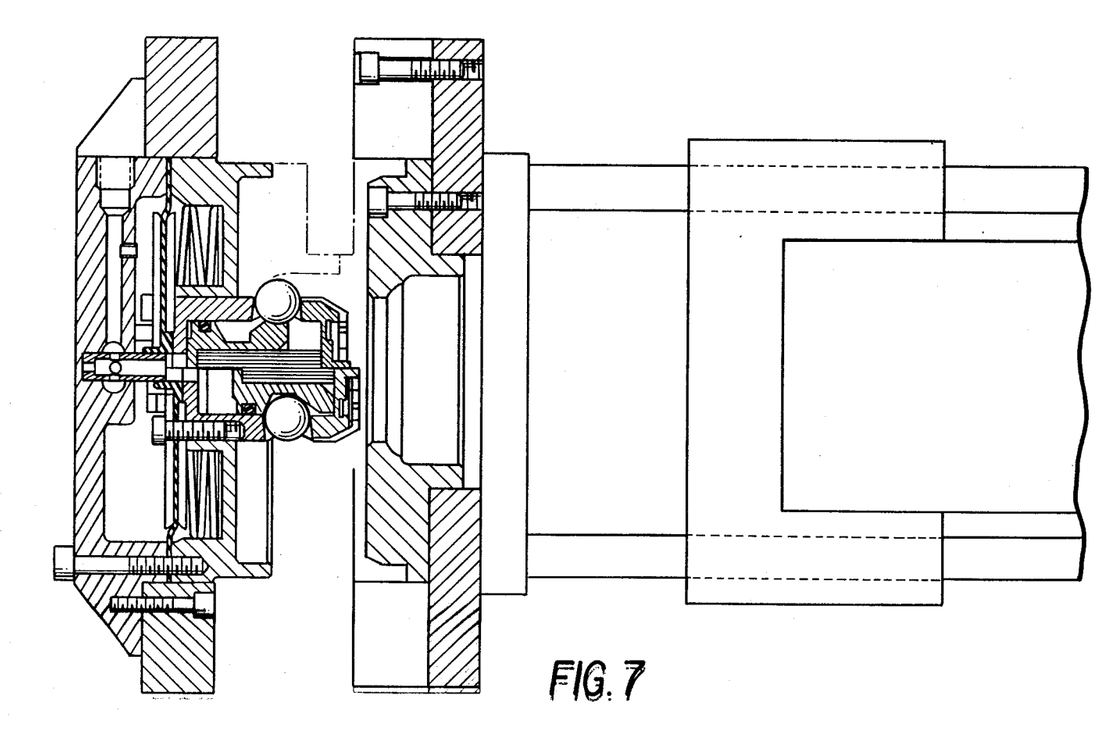
FIG. 7 represents a principal section of an upper interlocking device.
Figure 8:
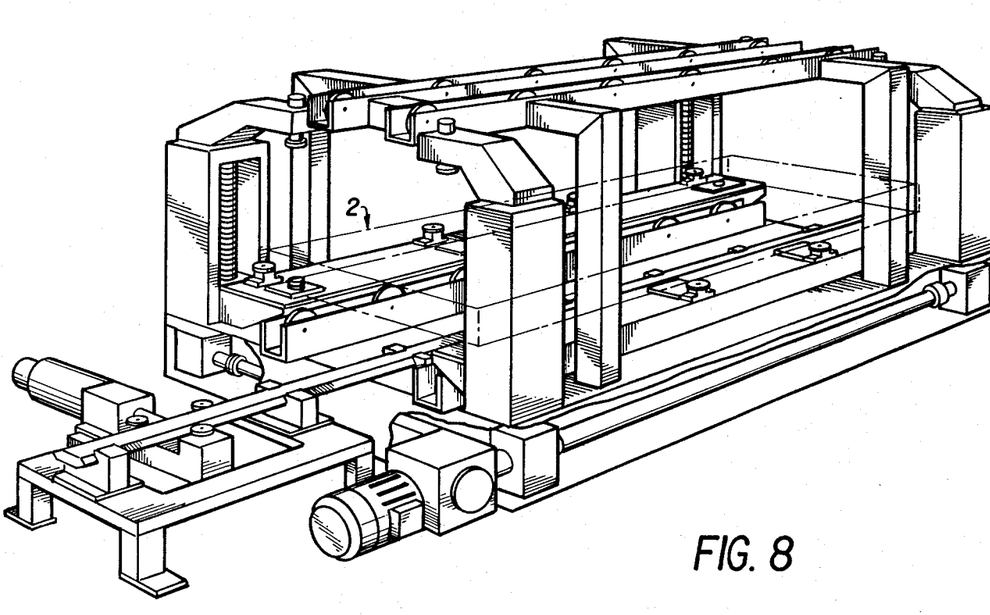
FIG. 8 represents the lower positioning part of a lower tool with the precision required for performing the welding spots.

The body assembly machine illustrated in FIGS. 1 to 9 is structured around three different types of tools:

a lower tool 2 providing a well-defined work positioning for the body 8; i.e., the body 8 is supported on the lower tool, two upper front (4) and rear (6) tools that can be detached from the structure of the machine at a work station and mounted to the lower tool 2, e.g., by resting on the lower tool 2 as seen in FIG. 2.

Each type of tool is further served by a tool-changing devices 10, 12, 14 or 16 that makes it possible to configure the geometry of the tools as a function of the type of vehicle in place.

This assembly machine functions as follows:

Once the three tools are selected, the operation for putting them in perfect registry with the geometry of a body 8 is performed by connecting these three tools. For example the front and rear tools are connected at their tops by the pin 18.

lower tool 2 will then be positioned with the precision required for performing the welding spots by the robots, the two upper front 4 and rear 6 tools are made floating in approach to their approach position, thus making possible a very precise automatic centering on lower tool 2.

Figure 9:
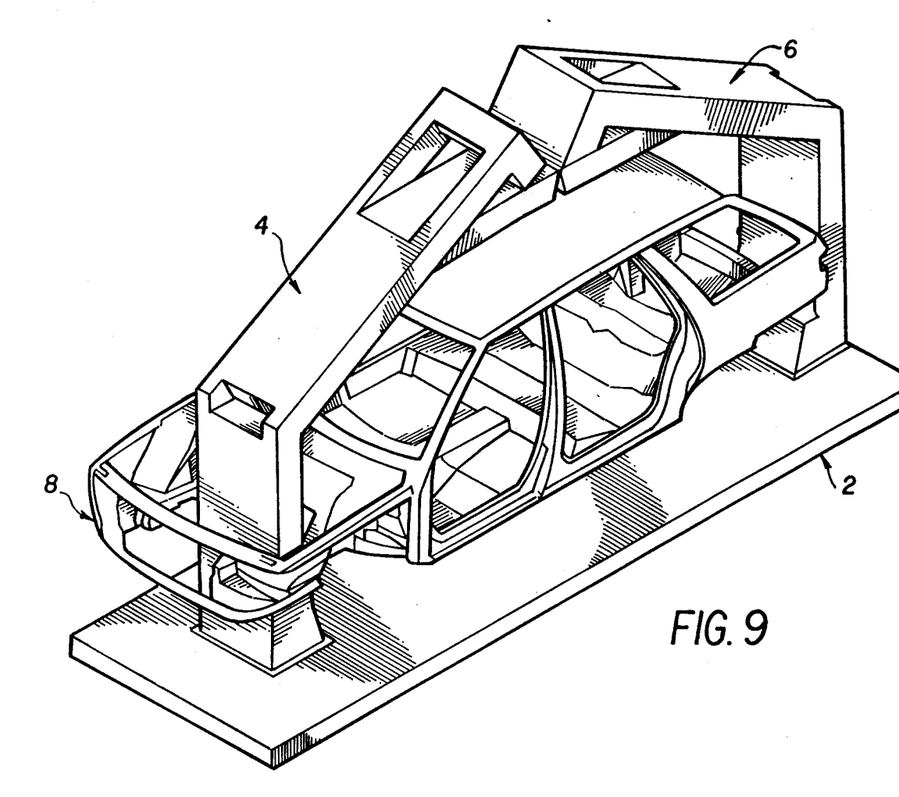
FIG. 9 represents an example of an application with an automobile.

After mutually interlocking of the three tools, the unit will form a rigid annular structure, independent of any outside structure, surrounding body 8 in its median plane as closely as possible (FIG. 9).

The advantages obtained prove to be very significant:
weight saving in the machine structure (no oversizing of the elements to reduce the sagging),
savings in the rigidity of the geometric ring,
increased repeatability over time,
geometric autonomy of the tools, making it possible to perform, off-line,
reference monitoring
tool adjustment and
the production of small series (pilot runs),
programming and optimization of robot paths.
time savings in production (work in covered time) and in line reconversion (reduction of downtime)
Preservation of the confidentiality surrounding any new automobile product, due to the possibility thus offered of studying and producing tools specific to the model, separate from the assembly machine
Positioning of the three interlatched tools in the assembly machine that can be performed within the tolerance of positioning the welding spots.

We claim:

1. Process for mounting tools for positioning vehicle bodies, comprising at least three tools including a lower tool positioned on the work station, a front upper tool, and a rear upper tool, comprising the steps of:

positioning the lower part of front tool by self-centering on the front part of lower tool;

positioning the lower part of rear tool by self-centering on the rear part of lower tool; and positioning the upper part of front tool by self-centering with the upper part of rear tool, thus forming a rigid annular structure independent of any exterior structure.

2. Process according to claim 1, wherein said lower tool is positioned relative to the exterior structure of the assembly machine with the accuracy required by for positioning of welding points on the assembled parts.

3. Process according to claim 1, wherein said front upper tool and said rear upper tool are made floating on the approach to their docking position, thus making self-centering possible on said lower tool following the step of self-centering of their upper parts.

4. Process according to claim 2, wherein said front upper tool and said rear upper tool are made floating on the approach to their docking position, thus making self-centering possible on said lower tool following the step of self-centering of their upper parts.

5. A process for precisely mounting tools for positioning a vehicle body, comprising the steps of:

mounting a vehicle body on a lower tool having means for supporting said vehicle body;

selecting additional tools from a tool magazine as a function of the geometry of the vehicle body supported on the lower tools; and mounting each of said additional tools on said lower tool and connecting said tools to form a rigid annular structure surrounding the body on the lower tool and alone capable of positioning the body.

6. The process of claim 5 including the steps of using robots for spot welding the body positioned by said annular structure.

* * * * *

UNITED STATES PATENT AND TRADEMARK OFFICE
CERTIFICATE OF CORRECTION

PATENT NO. : 4,946,089
DATED : AUGUST 7, 1990
INVENTOR(S) : DOMINIQUE BAULIER ET AL.

It is certified that error appears in the above-identified patent and that said Letters Patent is hereby corrected as shown below:

On the title page, in item [75]:
Please correct the Letters Patent by deleting the last two inventors' names that are duplicated as follows: "Bernard Negre, Paris; Alain Pierdet, Rosny-Sous-Bois, all of France".

Signed and Sealed this

Fifth Day of May, 1992

*Attest:*

DOUGLAS B. COMER

*Attesting Officer*  Acting Commissioner of Patents and Trademarks